United States Patent [19]

Moschter

[11] 4,259,408

[45] Mar. 31, 1981

[54] METHOD FOR THE FLAME BONDING OF A MOLDED COMPONENT OF SOFT POLYVINYL CHLORIDE WITH A MOLDED COMPONENT OF POLYOLEFIN

[75] Inventor: Erwin Moschter, Neunkirchen-Seelscheid, Fed. Rep. of Germany

[73] Assignee: Dynamit Nobel Aktiengesellschaft, Troisdorf, Fed. Rep. of Germany

[21] Appl. No.: 882,904

[22] Filed: Mar. 2, 1978

Related U.S. Application Data

[63] Continuation-in-part of Ser. No. 880,510, Feb. 23, 1978.

[30] Foreign Application Priority Data

Feb. 23, 1977 [DE] Fed. Rep. of Germany ....... 2707727

[51] Int. Cl.³ .................... B32B 27/40; B29C 25/00
[52] U.S. Cl. .................... 428/424.6; 156/82; 156/320; 156/322; 156/331; 156/332; 264/346; 428/315; 428/516; 428/520; 428/424.8
[58] Field of Search ............... 156/82, 322, 309, 324, 156/315, 332, 320, 331; 427/407 E, 407 F; 264/346; 428/315, 520, 516, 424; 526/320, 16, 49; 528/75, 47

[56] References Cited

U.S. PATENT DOCUMENTS

| | | | |
|---|---|---|---|
| 2,451,597 | 10/1948 | Wheeler | 156/82 |
| 2,828,237 | 3/1958 | Rosser | 156/331 |
| 3,028,367 | 4/1962 | O'Brien | 526/320 |
| 3,075,863 | 1/1963 | Frey | 428/520 |
| 3,108,986 | 10/1963 | Goldberg et al. | 156/331 |
| 3,382,215 | 5/1968 | Baum | 156/331 |
| 3,532,652 | 10/1970 | Zang et al. | 528/75 |
| 3,783,062 | 1/1974 | Martin | 156/82 |
| 4,046,587 | 9/1977 | Guglielmo | 427/407 E |

*Primary Examiner*—John J. Gallagher
*Attorney, Agent, or Firm*—Craig and Antonelli

[57] ABSTRACT

A method for bonding a molded component of soft polyvinyl chloride to a molded component to a polyolefin with the use of heat involves applying a layer of crosslinkable synthetic varnish resin containing an acrylic resin having hydroxyl groups to the surface of the molded component of soft polyvinyl chloride and bonding the layer and the associated soft polyvinyl chloride component to a molded component of polyolefin by flame lamination.

11 Claims, 1 Drawing Figure

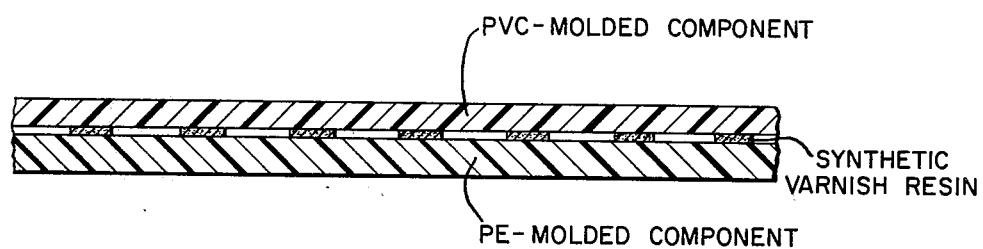

METHOD FOR THE FLAME BONDING OF A MOLDED COMPONENT OF SOFT POLYVINYL CHLORIDE WITH A MOLDED COMPONENT OF POLYOLEFIN

CROSS-REFERENCE TO RELATED APPLICATIONS

This application is a continuation-in-part application of co-pending application Ser. No. 880,510, filed Feb. 23, 1978.

The present invention relates to a method for the permanent bonding of a molded component of soft PVC to a molded component of polyolefin, with the application of heat.

It has been impossible, heretofore, to bond molded components of soft PVC with those of polyolefins in a satisfactory manner by means of a flame laminating operation, because the superficially molten polyolefin material does not exhibit any adhesion to the soft PVC. Even laminating methods with the use of an adhesive result in only minor adhesive strengths and/or do not provide a permanent adhesion. Two factors are essentially responsible for these results. One factor is the low adhesion of the adhesives to the polyolefins, the other factor resides in the presence of plasticizer in the soft PVC which, in due course of time, leads to a migration of the plasticizer out of the PVC into the adhesive and thus results in a lowering of the adhesion between the soft PVC and the polyolefin.

DOS [German Unexamined Laid-Open Application] No. 2,261,299 already describes the problems with adhesion in the manufacture of a composite material from a polyethylene foam material with a coated or uncoated synthetic fabric with the use of heat. According to DOS No. 2,261,299, the composite, multiple-layer material is produced by coating the fabric with a single- or bicomponent polyurethane resin and with temperatures of above the melting range of the polyethylene foam material and by utilizing additional pressure during uniting of the fabric with the polyethylene foam material. The process known from DOS No. 2,261,299 for the bonding of polyethylene foam material to synthetic fabrics is, however, unsuitable for the bonding of molded components from soft PVC to molded components on a polyolefin basis in a permanent bond, since the polyurethane resins employed do not provide a sufficient barrier effect with respect to the plasticizer, i.e. they do not sufficiently inhibit the migration of the plasticizer from the soft PVC into the intermediate layer. Furthermore, the use of pressure is disadvantageous for the foam materials taking part in the construction of the layered article, since such pressure leads to permanent deformations.

The above observations also apply to the process known from DOS No. 2,246,750, wherein likewise a polyurethane foam panel is disclosed to serve as an adhesion promoter for the production of composite materials formed from foam materials made up of non-crosslinked thermoplastics with other large-area articles, such as textiles, nonwoven mats, etc., with the use of heat and pressure.

In the process according to DOS No. 2,435,510, polyurethane resin is applied as the adhesion promoter to a polyethylene foam material for producing a composite material with a layer of polyethylene foam material, whereafter the thus-coated polyethylene foam material is further bonded. However, this process fails if a soft PVC molded component is to be bonded by flame laminating with the use of this process.

The invention has the object of bonding molded components on a soft PVC basis with molded components on a polyolefin basis permanently with the use of heat without additional pressure, wherein the bond shows a high adhesion, i.e. high splitting strengths. Factors to be considered, in this connection, are to obtain a good adhesion and simultaneously to avoid plasticizer migration from the molded component on a soft PVC basis.

The single drawing FIGURE illustrates a laminate obtained by the method of the invention.

The invention proposes, to attain the aforedescribed object, to apply to the surface of the molded component of soft PVC to be bonded a layer made of a crosslinking synthetic resin varnish having a basis of thermosetting acrylic resin which contains hydroxy groups; and also to bond the layer, before the termination of the crosslinking process of the synthetic resin varnish, to the molded component of polyolefin by means of flame laminating. It has been found, surprisingly, that by the use of a coating on the basis of a crosslinking acrylic resin, which contains hydroxy groups, a good adhesion promoter with a high adhesive strength is provided, simultaneously constituting a plasticizer barrier against the plasticizer migration from the PVC. Moreover, this now makes it possible to bond molded components on soft PVC basis with molded components on polyolefin basis with the use of flame laminating, which is an extremely economical procedure feasible at low expenditure.

The splitting strengths of the composite article obtainable by using the process of this invention range above the values of the material strengths of the individual molded components. Thus, it is possible by means of the method of this invention to establish economically, and with the aid of an uncomplicated operation, a bond of molded components of soft PVC to molded components of polyolefin, wherein the different characteristics of the materials can be fully exploited, so that even subsequent shaping of the composite article can be effected without having to worry about a subsequent destruction of the bond.

The molded components to be bonded preferably have the shape of sheets, films, panels, which can be continuously flame laminated. However, the utilization of the invention is not limited to these planar, flat components.

Especially suitable for the molded components of soft PVC are soft PVC molding compositions, for example, in the shape of films and soft PVC foam materials. Suitable plasticizers are all those known for PVC, such as phthalates, e.g. dioctyl phthalate, phosphate plasticizers, adipates, etc.

Suitable molded polyolefin components are non-crosslinked as well as crosslinked polyolefins, also in the unfoamed or foamed state. Preferred are polyethylene sheets and polyethylene foam materials, especially also crosslinked polyethylene foam materials, such as, for example, polyethylene foam materials having a basis of high-pressure polyethylene, produced with the aid of dicumyl peroxide as the crosslinking agent and azodicarbonamide as the blowing agent. The thermosetting acrylic resin utilized in the process of this invention includes copolymers of acrylic and/or methacrylic acid esters resulting, due to the incorporation of reactive groups, in a mixture with other reactive resins in indirectly hardening systems. During the thermosetting process, a crosslinking takes place. In the process of this invention, the crosslinking of the acrylic resins, which contain hydroxy groups, is effected particularly by isocyanate-containing curing agents.

An essential feature of the method according to this invention is to be seen in that the coating of the synthetic resin varnish is applied directly to the soft PVC as a liquid, for example by means of spraying, printing, pouring, knife-coating, spreading, atomizing, since, in this case, a good adhesion can be achieved between the selected synthetic resin varnish and the soft PVC. At the same time, however, the thus-applied layer also forms a plasticizer barrier, i.e. a barrier effect is obtained by this layer so that the migration of plasticizer from the PVC is prevented.

If the coating provided according to this invention is first applied to the polyolefin, it is impossible to establish a sufficient bond with the soft PVC. The bonding of the molded component of PVC, coated in accordance with the invention, to the molded component of polyolefin, can take place immediately or also at a later point in time, but in any event still prior to the end of the crosslinking of the synthetic resin varnish forming the coating, by means of flame laminating. The time period between the application of the coating and the end of the crosslinking procedure can be up to one day or longer, depending on the composition of the synthetic resin varnish used for the coating. The reaction time of the synthetic resin varnish can be from several minutes up to a number of hours. Generally, the reaction time is selected to be from 1 to 2 days. A synthetic resin varnish with hydroxy-group-containing polyacrylates and/or polymethacrylates, together with an isocyanate curing agent, is preferably employed for the coating.

To vary even the reaction time of the synthetic resin varnish, the varnish preferably has the following composition, in weight percent: 10–100 acrylic resin containing hydroxy groups; 1–50 curing agent on isocyanate basis; 0–90 solvent, e.g. esters, ketones, aromatic hydrocarbons, glycol ether acetates; 0–70 fillers, e.g. chalk, silicates, pigments.

An essential feature of the process of this invention is inherent in the properties of the coating which has a good to very good adhesion on the soft PVC and/or on the polyolefin material and cures and hardens due to its crosslinking characteristic. As mentioned above, reactive polyacrylates, which contain hydroxy groups, are preferably utilized for the coating.

The flame lamination step provided by the invention results in unexpectedly high splitting strengths between the bonded-together polyolefin materials and the soft PVC materials, ranging above the material strengths of the individual materials. Moreover, these high splitting strengths are achieved by the flame lamination without additional contact pressure bonding operations or any other process steps.

Depending on the composition of the synthetic resin varnish for the coating, as well as on the manner of applying the coating, e.g. by printing, spraying, pouring, knife-coating, spreading, atomizing, and so forth, the coating is more or less wet. Therefore, in a further development of the invention, the provision is made that the layer of synthetic resin varnish can be dried before the flame laminating step. The applied layer of synthetic resin varnish is relatively thin and has preferably a thickness of about 10–50μ in the wet condition. After drying, the thickness is then correspondingly reduced to 5 to 25μ.

The finished composite made up of the two molded components of varying materials can optionally be subjected to a tempering step, i.e. a heat treatment, to reduce stresses and warpage connected therewith.

The method of this invention is preferably utilized in the continuous bonding of sheets or panels made of crosslinked polyethylene foam material to soft PVC foam panels and/or soft PVC sheets by means of flame laminating. Such composite materials are suitable for use as thermal-insulating or noise-insulating or also shock-absorbing coverings, sheetings, etc.

The method of this invention will be explained hereinbelow with reference to two examples.

EXAMPLE 1

In a printing machine, with the aid of a 48 gauge screen roller, a layer of a synthetic resin varnish is applied to a chemically expanded soft PVC foam sheet with a ratio of PVC to plasticizer, e.g. benzyl butyl phthalate, of 63:37, provided in rolled-up form, this print being applied to the backside of the sheet. The synthetic varnish coating consists of 35% by weight of an acrylic resin-containing hydroxy groups, i.e. "Paraloid OL-42" by Rohm & Haas, USA, or "Degalan LS 50/100" or "Degalan 150/300" by Degussa, or "Macrynal SM 500" by Hoechst AG; 32% by weight of fillers, i.e. chalk; 13% by weight of xylene; 12% by weight of ethyl glycol acetate; 8% by weight of isocyanate curing agent, (i.e. "Desmodur" N, IL by Bayer AG). In a subsequent drying tunnel, the varnish layer is dried to a degree called dust-dry at 80° C. The dried coating then has a thickness of about 6–7μ, whereas previously the layer, applied in the wet condition, had a thickness of approximately 30μ. However, it is not absolutely necessary to dry the coating. Subsequently, the thus-coated sheet enters a flame laminating device with a flame bar and is bonded directly behind the flame bar to a continuously fed, crosslinked polyethylene foam sheet while passing through a subsequently arranged pair of rolls having a roll nip of, for example, 19 mm at a total thickness of the material of 20 mm, and is then cut to the desired size. The resultant composite panels are then stored for cooling and curing on planar storage blocks for one to two days. These panels can optionally be subjected to a heat treatment to reduce stresses and warping, e.g. at 80° to 110° C. for 1 to 2 minutes. Thereafter, the panels are cut along the edges and subjected to a finishing step.

EXAMPLE 2

A coating of synthetic resin varnish having the composition indicated in Example 1 is applied unilaterally to a commercial soft PVC roofing sheet with a ratio of PVC to plasticizer of 62:38 in a continuous process in a printing machine by means of a 48 gauge screen roller. After drying of the coating, the thus-coated sheet is again introduced into the flame laminating device and is bonded, as in Example 1, to a continuously fed, crosslinked polyethylene foam sheet. Depending on the desired usage, the composite sheets are then wound up on reels and cut to size and then remain one or two days on storage blocks, optionally combined with a heat treatment of 100° C. for 1 minutes, before they are subjected to the further finishing operation. Such composite materials can be used, for example, in thermal-insulating coverings.

The method of this invention is nowise restricted merely to molded components built up of one layer on PVC basis or polyolefin basis, respectively. It is also possible to bond multiple-layer molded components, each of which has a layer on a polyolefin basis and/or on a soft PVC basis, along the lines of this invention, i.e. to obtain by using the method of this invention a firmly adhering bond of the materials having a polyolefin basis to the materials having a soft PVC basis.

It will be appreciated that the term "soft polyvinylchloride" as used herein refers to a molding composition in which the mixing proportion of a polyvinyl chloride resin and plasticizer is between 80:20 and 50:50, respectively, based on a total of 100 parts by weight. The term "polyvinyl chloride resin" designates a homopolymer of vinyl chloride as well as copolymer of vinyl chloride with monomer such as vinyl acetate, vinylidene fluoride, or vinylidene chloride; generally the vinyl chloride comprises at least 60% by weight and usually from 85 to 95% by weight of the monomeric mixture. Also, other polymers may be mixed with and replace a portion of the polyvinyl chloride resin in the molding composition. For example, modified acrylate resins, butadiene or ethylene copolymers or ethylene vinylacetate copolymers may replace from about 5-15% by weight of the polyvinyl chloride resin.

Furthermore, auxiliary materials and additives, such as stabilizers, lubricants, extenders, pigments, and fillers, can be added to the soft polyvinyl chloride in the usual amounts. Here usual amounts means approximately 10 to 50 parts by weight of fillers and 0 to 10 parts by weight of colorants, stabilizers, lubricants, or similar substances, based on 100 parts by weight of the soft polyvinyl chloride molding composition.

Examples of stabilizers are organic phosphites, epoxidized soybean or castor oils, barium/cadmium soaps and zinc soaps, monobasic or polybasic lead compounds, UV-absorbers, paraffins, and synthetic waxes. Considered as fillers are: chalk, silicates, aluminum hydroxides, ground rock, cellulose, and considered as pigments or colorants are practically all inorganic or organic pigments or colorants as well as carbon black.

As fusible polyolefins can be employed as the molding polyolefin component to be bonded, i.e. polyethylene, polypropylene, nd copolymers of ethylene and propylene as well as mixtures of the same. Preferably a chemically crosslinked polyethylene foam material is used that has a crosslinking rate of from approximately 70 to 80% and that has been manufactured from a high pressure polyethylene having a molecular weight of approximately 40,000 utilizing dicumyl peroxide as the crosslinking agent and azodicarbonamide as the blowing agent. The manufacture of such a chemically crosslinked polyethylene foam material is described for example in U.S. Pat. No. 3,651,183.

It will also be appreciated that the hydroxy-containing resin used in the synthetic resin varnish has a hydroxy content, percent by weight OH, based on solid resin, of approximately 1 to 4.5. Conventional commercial products suitable for purposes of this invention include Degalan, a product of Degussa BRD or Desmophen, a product of Bayer A. G., West Germany. Alkylated acrylates, i.e. those having methyl, ethyl or propyl groups may be also used.

Among the suitable solvents for use in the resin varnish are ethylene glycol monoacetate, methyl isobutyl ketone, methyl ethyl ketone and xylene.

As crosslinking agents preferably isocyanates, such as polyfunctional aliphatic isocyanate, are used. The isocyanate can be utilized free of solvent or in one of the above-mentioned solvents, e.g. dissolved in a solvent mixture of ethylene glycol monoacetate and xylene.

The flame laminating step can be carried out at an average operating speed of 8 m./min.; the distance of the burners from the surface of the molded polyolefin component is approximately 20 mm., the gas pressure is about 1.5 mbar at the burner, and the surface temperature reached on the molded polyolefin component is for a short time greater than 700°-900° C.

It is not absolutely necessary to press both molded components against each other. Such a compression is only an additional measure, for instance, with molded components that are not completely planar.

The bond between the molded components occurs finally due to the fact that the acrylic resin layer completes its reaction after the flame laminating and after the final crosslinking.

The separating strength is determined according to DIN No. 53,357 and is approximately 20-25 N/5 cm. in the above examples. The acrylic resins containing hydroxy groups are for example produced by partially estering (oeresteru) acrylic acid with bifunctional alcohols. The bifunctional alcohols e.g. ethylene glycol, diethylene glycol, propan-1.5-diol and others.

What is claimed is:

1. A method for the bonding of molded components of soft polyvinyl chloride containing polyvinyl chloride and a plasticizer for the polyvinyl chloride to molded components of a polyolefin with the use of heat, which comprises applying a layer of a crosslinkable synthetic resin varnish containing an acrylic resin that contains hydroxy groups and an isocyanate-containing curing agent to a surface of the molded component of the soft polyvinyl chloride to be bonded; and bonding the layer, prior to the end of the crosslinking reaction, to the molded component of polyolefin by flame laminating; said varnish layer-coated molded component of soft polyvinyl chloride and said molded component of a polyolefin being heated by a flame during said flame laminating.

2. The method according to claim 1, wherein the acrylic resin comprises a hydroxy group-containing polyacrylate and/or polymethacrylate.

3. The method according to claim 1, wherein the synthetic resin varnish comprises:
   10-100% by weight of hydroxy-group-containing acrylic resin
   1-50% by weight of an isocyanate-containing curing agent
   0-90% by weight of a solvent for the acrylic resin
   0-70% by weight of a solid inert particulate filler.

4. The method according to claim 1, wherein the layer of synthetic resin varnish is dried prior to the flame laminating.

5. The method according to claim 1, wherein the layer of synthetic resin varnish is applied in the wet state to a thickness of 10 to 50μ.

6. The method according to claim 1, wherein the bonded molded components are subjected to a heat treatment to remove stresses from the resultant composite.

7. The method according to claim 1, wherein the molded components of soft polyvinyl chloride are bonded to molded components of non-crosslinked or crosslinked polyolefin film or polyolefin foam material by means of the flame laminating.

8. The method according to claim 7, wherein the polyolefin is non-crosslinked polyethylene.

9. The method according to claim 7, wherein the polyolefin is crosslinked polyethylene.

10. The method according to claim 1, wherein the molded component of a soft polyvinyl chloride contans a polyvinyl chloride resin and a plasticizer for the polyvinyl chloride resin in a ratio of from 80:20 to 50:50 by weight.

11. A composite of molded soft polyvinyl chloride bonded to a molded component of polyolefin by an adhesive layer of crosslinked acrylic resin produced in accordance with the method of claim 1.

* * * * *